June 10, 1969  J. CLARK  3,448,791
METHODS AND APPARATUSES FOR ENERGY TRANSFER
Filed May 20, 1965  Sheet 9 of 9

INVENTOR
James Clark
By: Stevens, Davis, Miller & Mosher
Attorneys

United States Patent Office 3,448,791
Patented June 10, 1969

3,448,791
METHODS AND APPARATUSES FOR ENERGY TRANSFER
James Clark, P.O. Box 3035, Dayton, Ohio 45431
Filed May 20, 1965, Ser. No. 457,394
Int. Cl. F28f 27/00; F25b 29/00; F28d 21/00
U.S. Cl. 165—1
38 Claims

ABSTRACT OF THE DISCLOSURE

A system for controlling the transfer and flow of thermal flux including a heat source and a heat sink being in proximity to each other, a P material and an N material joined to form a PN junction and being arranged between said source and said sink such that thermal flux flows from the source to the sink through one of said materials and through the PN junction then through the other of said materials, an electrical biasing means for controlling the biasing of said PN junction such that forward biasing raises the thermal flux conductivity and reverse biasing lowers the thermal flux conductivity. In an alternate arrangement, a third semiconductor electrode is physically spaced from the outer layer of said PN junction configuration and is formed of the opposite type of semiconductor material nearest thereto. A gas flow is established between the outer and third layer with electric biasing means biasing the respective layers of material so as to provide a three electrode transistor configuration.

---

The invention relates generally to methods and apparatuses for the change of thermal flow between two thermal sources and/or the change of viscosity of a fluid in the region near a body in the fluid and/or the change of skin drag on a body in a fluid.

An object of the invention is the control of heat flow between two thermal sources.

A further object of the invention is the control of drag on a body in flowing fluid.

Another object of the invention is the control of viscosity of a fluid in the neighborhood of a body in that fluid.

An additional object of the invention is any combination of the above objects.

A still further object of the invention is the use of semiconductor properties to control thermal flow between two heat sources.

Another object of the invention is the control of heat transfer by employing electric fields and their gradients.

These and other objects of the invention will be apparent from the following detailed description read in conjunction with the accompanying drawings, wherein:

FIGURES 6a, b, and c diagrammatically show, by way of example, the effect of an electrical field acting on a semiconductor diode junction;

FIGURE 13 shows diagrammatically a bubble or droplet surrounded by a Helmholtz double layer of electric charges.

In the figures, corresponding elements are designated by the same reference numerals.

The use of electric fields and semiconductor effects may influence the three forms of heat transfer as follows:

(a) *Radiation*

Photons of light, or luminous energy, may be absorbed by photoelectric-type semiconductor materials and converted into an electromotive force. This may be used with other semiconductor materials as described below, to reduce or control the thermal transfer to a body.

(b) *Convection*

Electric fields and their associate gradients may be used to control the motion of electrically charged bodies such as atoms, ions and electrons, in a fluid flow, relative to a solid body.

(c) *Conduction*

Electric charges on a solid body may be used to control the motion of molecules, atoms, ions, and electrons relative to the body thereby controlling the thermal transfer between the fluid and the solid body. Semiconductor effects may also be used to control the thermal transfer through a composite solid body.

Figure 1:
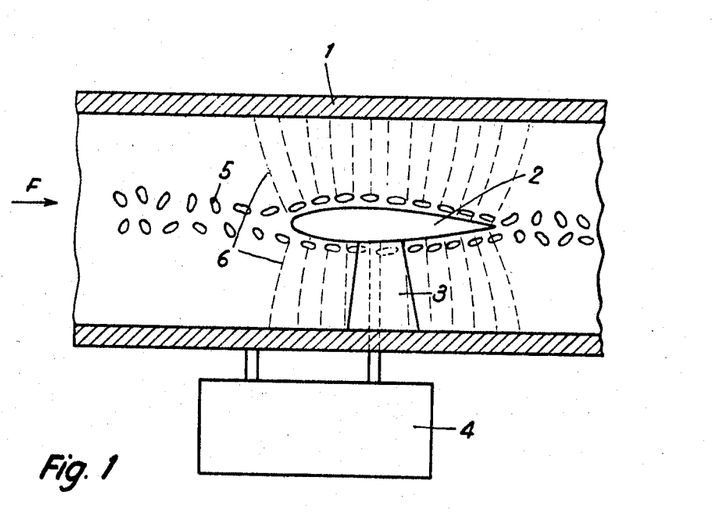
FIGURES 1 and 2 show two different forms of the invention.

Referring to FIGURE 1, an aerodynamic or hydrodynamic body 2 is arranged within a pipe or reference electrode 1 and exposed to a fluid flow moving in the sense of the arrow F. The body is supported by an electrical insulator 3. An adjustable high voltage supply 4 is connected to the body 2 and the pipe 1. The electric field between the pipe and the body is indicated by dash lines 6.

When an electric field is applied between a heat exchange surface and a reference electrode as shown in the enclosed FIGURE 1, any molecule 5 having natural, or induced, dipole moments will be subjected to an alignment action by the electric field. A normal molecule will also be given an induced dipole by its motion in an electric field. Since the electric field is greatest at the surface of the body 2 shown in FIGURE 1, maximum dipole alignment of the molecules 5 will occur in the boundary layer of the fluid adjacent to the body 2. This alignment of polar molecules changes the local viscosity in the boundary layer, which in turn changes its thermal conductivity, and, as will be later explained, the skin friction drag on the body 2. This change is especially apparent in water, since approximately twenty-five percent of the water molecules have a natural polar moment.

The embodiment is advantageously employed in heat exchange systems, such as heating or cooling systems, wherein an efficient exchange of heat is desired between the fluid, which admits of dipole alignment of its molecules, and the heat exchange body 2.

It will be appreciated, in this figure as in all succeeding figures, that the representation of the various elements, such as the heat exchange body 2 or the reference electrode 1, is purely diagrammatic and not necessarily indicative of the true shape of these elements in any given application, which shape, as understood by those skilled in the art, will be determined by each particular practicable employment of the embodiment.

Figure 2:
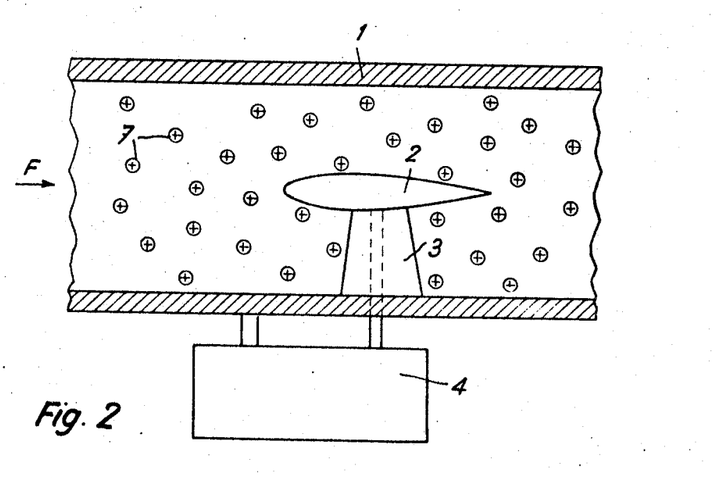

In another embodiment, charged bodies 7 in a fluid flow may be attracted to or repulsed from a heat exchange surface by charging the surface of body 2, as shown in FIGURE 2. The charged bodies or charge carriers 7 may be ions in the fluid flow and/or foreign bodies, for example, that have acquired a static charge by friction in the fluid flow. The fluid can be an electrolyte, sea water, or non-saline or fresh water. The electric charge on the heat transfer surface, established by the difference in potential between 1 and 2, may also be used to neutralize the electrically charged bodies in the fluid flow, before they have had a chance to enter into electrochemical action with the heat transfer surface, or with another charged body on the heat transfer surface of body 2, thereby liberating heat. The high voltage supply 4, assuming that the positive bodies 7 are to be repelled, would, in the particular embodiment illustrated at FIGURE 2, make the body 2 positive. The charge on the outside surface of body 2 can also be supplied by the embodiment of FIGURE 16.

It will be appreciated that, as in the form of FIGURE 1, the electric field between 1 and 2, causing dipole alignment of molecules of the fluid, thereby affects the viscosity of the fluid and thus changes the thermal conductivity between the fluid and the body 2.

This form of the invention may be useful wherever the problem of heat exchange arises, such as in heating and cooling systems, the reference numeral 2 designating the heat exchange surface or body.

However, the embodiment is also applicable to air craft, such as space ships and aeroplanes, wherein the problem is encountered of reducing, or preventing excessive rise of, the temperature of the craft's "skin." In regard of space ships, the ship, in employing the invention, can discharge, at the nose of the ship, for example, cesium as it reenters the atmosphere. The heat of friction ionizes the cesium into positive ions, and the surface of the ship, which is given a positive charge, repels the ions. The repulsion of the ions reduces the heat transfer between the fluid and the body and, because the repelled cesium ions sweep with them some gas ions, likewise reduces the skin friction of the body in the fluid. In this form of the embodiment the electrode 1 and the power supply 4 are eliminated.

It is also true in this form that simply giving the surface of the air craft a charge such that the surrounding gas ions will be repelled, without also discharging an ionizable divided metal, will reduce the drag or skin friction and the heat flow. Generally, because gas ions are usually positive, the charge on the craft will also be positive.

In another aspect of the invention, when an ion having an electric charge is accelerated relative to an electric field gradient, as shown in FIGURE 1, the ion is subjected to a dynamic force which is proportional to the magnitude of the charge and the acceleration, and to the square of the slope of the field gradient. This dynamic force will give a resultant change in motion of an ion or other charged body in a fluid flow relative to a heat exchange surface. By controlling the location and shape of the electrodes and the magnitude of the applied potential, the slope of the field gradient may be varied adjacent to the heat exchange surface, thus helping control the thermal transfer. This form of the invention is shown at FIGURES 2a and 2b.

Figure 2A:
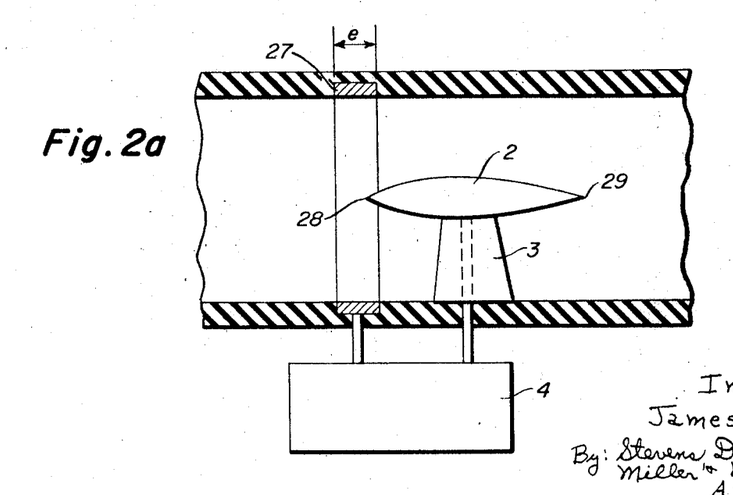
FIGURES 2a and 2b show two further forms of the invention.

Referring to FIGURE 2a, the pipe 26 is made of a dielectric material, in contradistinction to the pipes 1 of FIGURES 1 and 2, and has located therein an electrically conductive ring electrode 27. By varying the width $e$ of the ring and/or its location with respect to, and its distance from, the body 2, as well as by varying the potential applied by source 4 between the ring and the body, the slope of the field gradient will be caused to vary as one moves from the "nose" 28 of the body 2 towards the "end" 29.

Figure 2B:
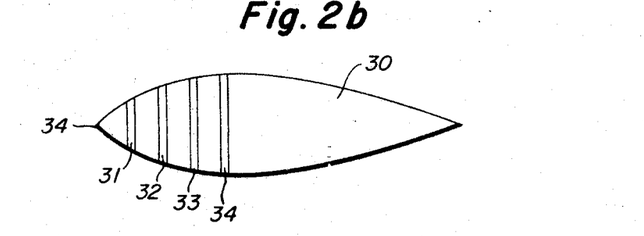

For air craft, such as aeroplanes, missiles, or space ships, the craft 30 can be provided, as shown at FIGURE 2b, with a series of electrode rings 31, 32, 33, 34, etc., of which each successive ring, counting from the "nose" 34, is at a lower potential.

In the embodiments of FIGURES 2a and 2b any dipole alignment of molecules in the fluid through which the craft is borne, caused by the electric field of 2 and 27 or of 30, 31, 32, and 33, affects the viscosity of the fluid, as already explained, and thus also affects heat conductivity between the fluid and the body 2 or craft 30.

Figure 3:
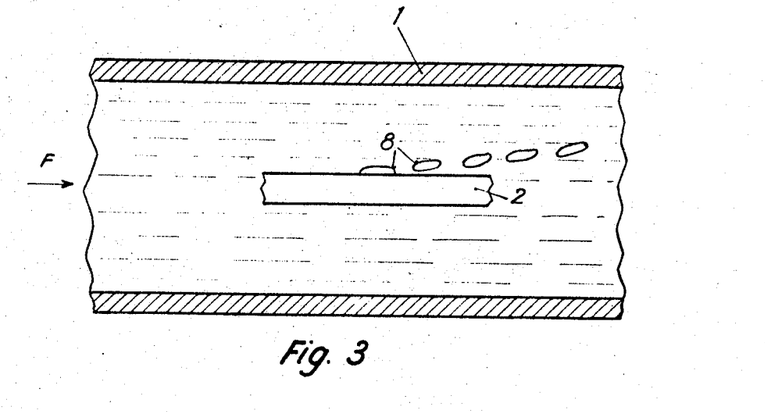
FIGURE 3 shows the formation of bubbles in a liquid boiling on a heat transfer surface.
Figure 4:
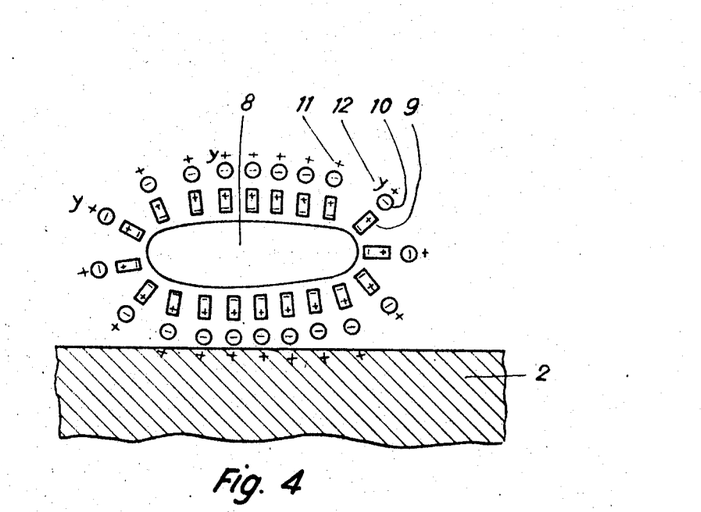
FIGURES 4 and 13 show a bubble surrounded by a Helmholtz double-layer.

In a still further embodiment, when a change in state occurs in a fluid or solid, there is an associate change in local electric charges. When bubbles 8 form in boiling liquids on a heat transfer surface of the body 2, such as shown in FIGURE 3, a local Helmholtz double layer of electric charges is formed around the bubbles, as shown in FIGURE 4, with part of this double-layer occurring adjacent the heat transfer surface in the form of a space charge. This also occurs during condensation when a droplet of liquid forms on the heat transfer surface. A description of the classical Helmholtz double layer which forms about a bubble in a liquid is contained in Static Electrification by Leonard B. Loeb, pages 20–32, 66–80: Springer-Verlag, Berlin, 1958.

Figure 5:
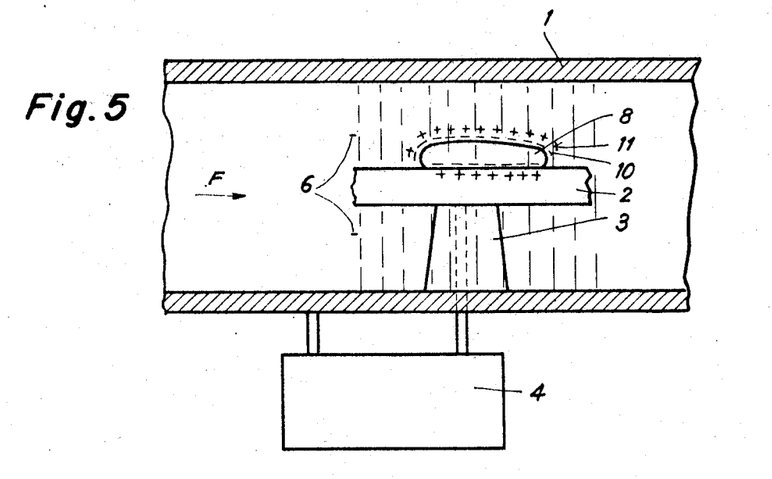
FIGURE 5 shows the collapse of a bubble caused by unbalanced electrical field forces.

Further in FIGURE 4, reference numeral 9 designates a polar molecule of water, 10 a negative OH ion, 11 a proton, and 12 a positive ion. The negative OH ion and the proton together constitute the Helmholtz double layer. The space charge comprises those OH ions adjacent the heat transfer surface. In FIGURE 5, the double layer is similarly constituted of the proton 11 and the OH ion 10.

It has been found that by applying a potential gradient between a reference electrode 1 and the heat transfer surface of body 2, which surface passes through a bubble or condensation droplet 8 being formed on the surface, an appreciable unbalance may be obtained between that portion of the Helmholtz double layer on the outer portion of the bubble or droplet, relative to that portion between the bubble or droplet and the heat transfer surface, as shown in FIGURE 5. This unbalance in electric field forces causes large bubbles to collapse or sink against the heat transfer surface, resulting in a greater "wetted-area" per unit time on the heat transfer surface. Since the heat transfer between a fluid and a solid occurs in the form of phonon and electron conduction, means which will increase the effective contact area and reduce the electrical resistance at the fluid-solid interface will increase the local thermal conductivity. Thus the applied electric field dissipates or neutralizes the local space charge set up adjacent to the heat transfer surface shown in FIGURE 4 which causes the collapse of large bubbles, resulting in a greater phonon and electron transfer across the fluid-solid interface. Any increase of direct electron migration across this interface as a result of the applied electric field will also result in an increase in thermal conductivity, since this electric current also causes some transfer of thermal energy. In other words, the local area in the fluid-solid interface has semiconductor characteristics because of its variation in electrical resistivity in the presence of the electrc charges from the Helmholtz double layer.

The form of FIGURE 5 is applicable to heating systems, such as a boiler, or in cooling systems, such as a cryostat, or in any employment generally in which it is desired to get an efficient exchange of heat between the fluid and the heat exchange body 2. For example, in a refrigeration system, the fluid may be a refrigerant, such as that known under the trademark of Freon gas, and 2 a heat exchange surface of suitable shape for extracting heat from the gas.

It will be appreciated that the exemplary embodiments of FIGURES 1, 2, and 5 are generally applicable to air craft, such as airplanes, missles, space craft, etc., wherein the surface of the craft is given a charge of polarity such that the local gas ions are repelled, if it be desired to reduce heat flow between the fluid and the craft and to reduce skin friction, as will be further explained later, or such that the ions are attracted, if it be desired to increase the rate of heat flow between the fluid and the craft. In these forms the electrode 1 and the power supply 4 are eliminated.

The thermal conductivity through semiconductors consists of the phonon, (lattice), conduction $\kappa_{ph}$ and the electron conduction $\kappa_e$. Therefore the total thermal conductivity is:

$$\kappa = \kappa_{ph} + \kappa_e$$

By selecting materials having the proper semiconductor characteristics, the desired ratio of, $\kappa_{ph}$, to $\kappa_e$ may be obtained. The value of $\kappa_{ph}$ may be reduced by using a crystal lattice composed of two different atoms, or one having a reduction in the lattice symmetry. In these semiconductor materials, it is also possible to obtain an interaction between the phonons and the electrons, known as phonon scattering by electrons, thereby varying the flow of phonos transporting the thermal energy. This phenomenon is described in Semiconductors by Jan Tauc. pages 50–53, Pergamon Press, 1962; and in Thermoelectricity by Robert R. Heikes and Roland W. Ure, Jr., pages 91–118, Interscience Publishers, 1961.

From the above it is evident an appreciable change in the phonon and electron thermal conductivity may be obtained in semiconductors wherein phonon thermal conduction has been reduced and electron thermal conduction increased. If these materials are used in diode and transistor-type junctions, an appreciable variation in the thermal conductivity across such composite assemblies may be obtained, with the use of auxiliary electric circuits furnishing "forward" or "reverse" biasing as required. One example of semiconductor materials having low lattice (phonon) conductivity and good stability at 800–1600° K (these being the surface temperatures of air craft flying at Mach 3 to 5) is the N-type material, $CbS_{1.35-1.50}$, and the P-type material $ThS_{1.71-1.76}$. In all metals, and in most semiconductors, heat transport is by electron migration chiefly.

Some applications of these semiconductor materials in the control of heat transfer will now be described.

Figure 6:
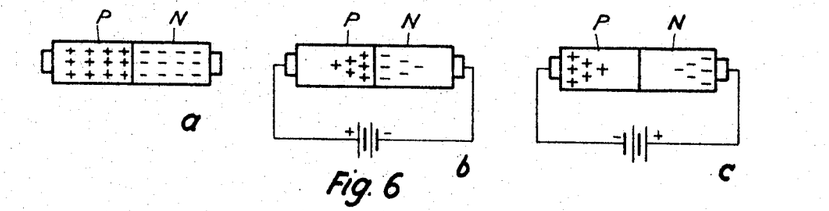

A diode, or P–N type junction formed between two pieces of semiconductor material is shown schematically in FIGURE 6a, in which the P-type material designated by P contains an excess of positively charged "holes," while the N-type material, designated by N, contains an excess of free electrons. If a P–N junction is "forward" biased by a battery or other DC source as shown in FIGURE 6b, an electric current will flow through the junction. While if it is "reversed" biased as shown in FIGURE 6c, only a minute amount of current will flow through the junction.

Figure 7:
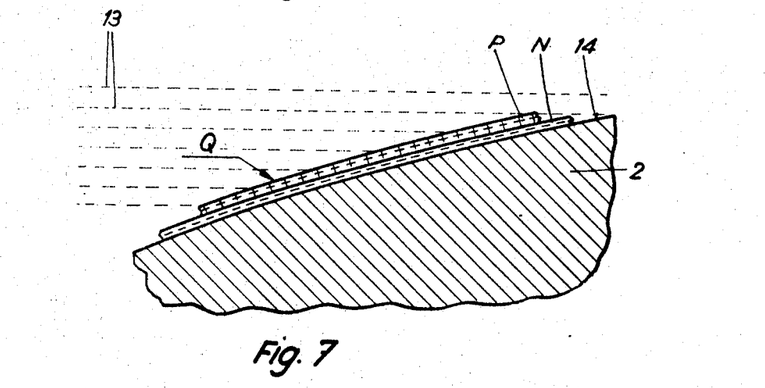
FIGURE 7 shows a P–N type junction wherein electrons contained in the fluid flow are used to "reverse" bias the P-type surface layer of semiconductor material and thereby reduce the thermal conductivity between the fluid flow and the heat transfer surface to a minimum.

These same principles can be used to control the thermal conductivity across composite assemblies of semiconductor materials. In FIGURE 7 a P–N type junction is shown in which electrons 13 contained in the fluid flow (the fluid acting as the battery of the electron source) are used to "reverse" bias the P-type surface layer of semiconductor material and thereby reduce the thermal conductivity between the fluid flow and the heat transfer surface to a minimum.

In this embodiment it is assumed that the fluid has free electrons, such as would be true of a fluid ionized in nature, as the ionosphere, or of a fluid ionized artificially, as by radioactive material on the outer surface of the semiconductor junction. The body 2 could be that of an air vehicle, such as a space ship or an aeroplane, with the P–N junction covering a portion of the outer surface of the vehicle and acting as a thermal-electric generator, by subtracting heat from the fluid and converting it into electricity for use on board the vehicle.

More broadly, 2 may be regarded as any body or surface to which it is desired to reduce the flow of heat from the surrounding fluid.

Figure 8:
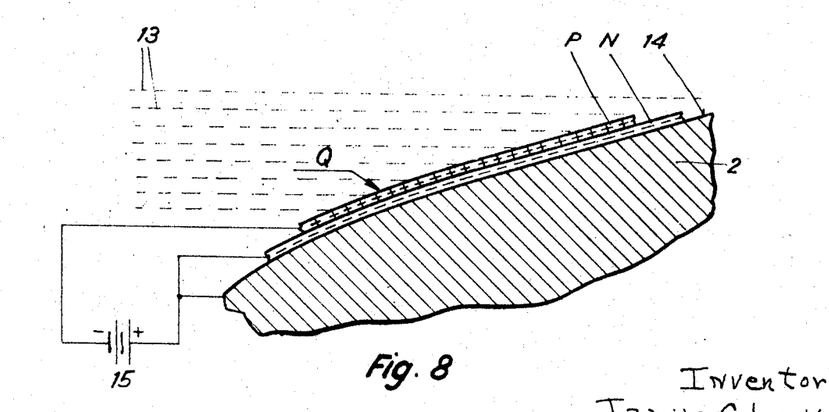
FIGURE 8 shows an arrangement for reducing the heat transfer from the fluid flow to the heat transfer surface by "reverse" biasing the P–N junction.

The heat transfer from the fluid flow to the heat transfer surface 14 may be still further reduced by "reverse" biasing the P-N junction with a battery 15 or power supply, as shown in FIGURE 8. The reference letter Q in the figure designates the thermal flux flow. Of course, as in the preceding embodiment, the free electrons 13 also serve to "reverse" bias the P-N junction.

Figure 9:
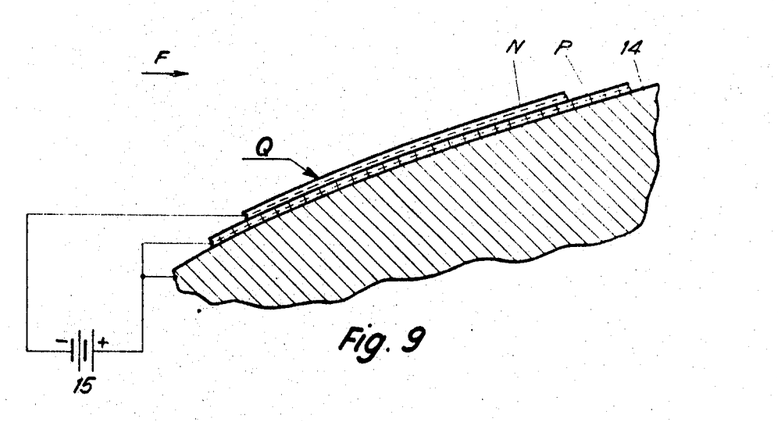
FIGURES 9 and 10 illustrate arrangements for increasing the thermal conductivity.

The same principle may be used to increase the thermal conductivity from the fluid flow F to the heat transfer surface 14 by "forward" biasing the N-P junction, as shown in FIGURE 9.

Figure 10:
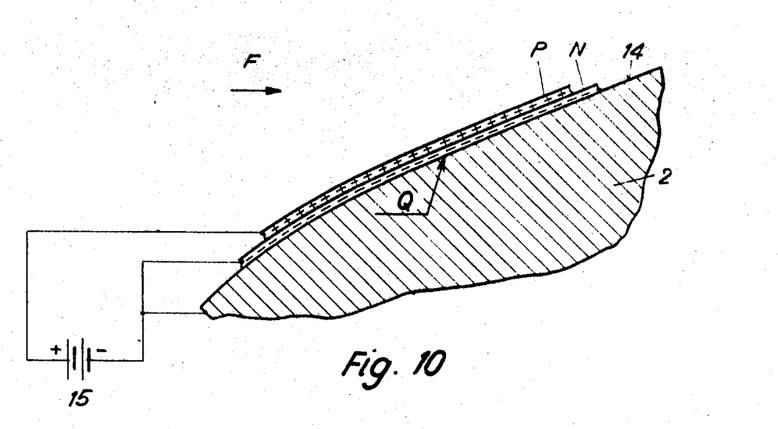

The thermal conductivity between the heat transfer surface 14 by "forward" biasing the N-P junction, as shown biasing the P-N junction, as shown in FIGURE 10. A comparison of FIGURES 9 and 10 will indicate that the direction of maximum thermal conductivity may be controlled by the order in which the P-type and N-type materials are deposited on the heat transfer surface and the manner in which they are biased. It is obvious from FIGURES 6, 9 and 10 that the electron components $k_e$, of the thermal conductivity may be changed from maximum in a given direction, toa minimum in this same direction by merely changing the bias from "forward" to "reverse." The magnitude of the thermal conductivity may also be controlled by varying the bias.

Semiconductor properties may be used to control the heat transfer between fluids and solids, by coating the solids with P-N or N-P or P-N-P or N-P-N semiconductor materials and controlling the thermal conducting electron flow through the junction regions by either "forward" or "reverse" biasing, and controlling the magnitude of the bias current.

Figure 11:
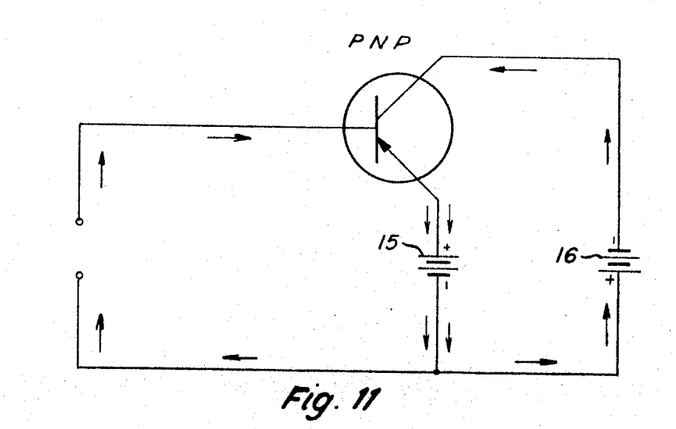
FIGURE 11 is a schematic of a PNP-type transistor amplifier.

By way of introduction, the simple transistor circuit shown in FIGURE 11 will be described. This circiut is the normal common-emitter amplifier with the base "forward" biased by a battery 15 to permit a large flow of electrons from the collector to the emitter as shown diagrammatically by the arrows in FIGURE 11. If the polarity of the base bias battery is changed so that the base-emitter is "reverse" biased, the electron flow from the collector to the emitter will be stopped.

Figure 12:
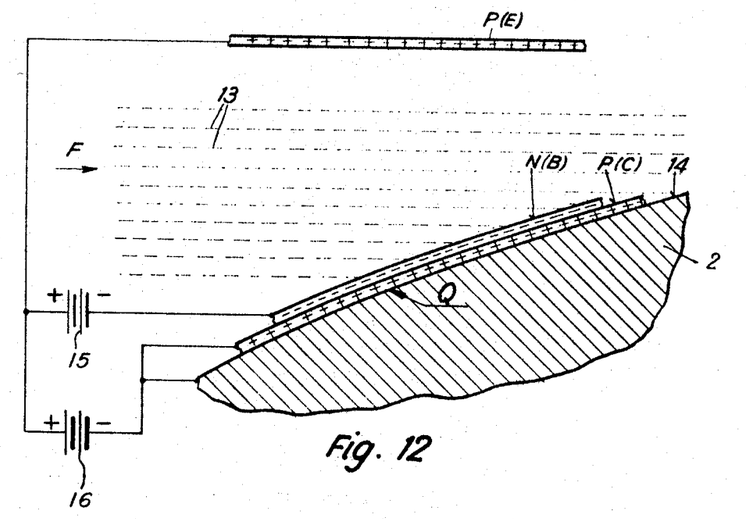
FIGURE 12 shows a practicable embodiment in which semiconductor properties are utilized.

The electric charges in a fluid flow adjacent to a solid body may be used as the "depletion" area between two of the semiconductor elements of a transistor as shown in FIGURE 12. The battery 15 serves to establish a "forward" bias between the N-type material of the base N(B) and the P-type material of the emitter P(E). Battery 16 then furnishes the main source of electrons passing from the P-type material of the collector P(C) to the P-type material of the emitter. Any electrons carrying thermal flux Q from the heat transfer surface 14 to the fluid flow, may also follow the same path traversed by the electrons from battery 16. Under some conditions, in order to simplify the composite semiconductor structure shown schematically in FIGURE 12, the P-type material of the collector may be made by properly treating the heat transfer surface itself. The surface can be treated, for example, by diffusing into it chemicals or finely divided particles to give it P or N type characteristics. The naturally occurring oxide coatings on metals have semiconductor characteristics that can be improved by the aforesaid diffusion technique to obtain the desired P or N semiconductor that forms an intgeral part of the surface. The embodiments of FIGURES 7, 8, 9, 10, 12, 15, and 16 may advantageously employ such integral semiconductor coatings.

The "depletion area," mentioned above, is that area, associated with the interface between, or with the junction of, two dissimilar (N and P) semiconductive materials, from which holes or electrons are removed under the influence of an electrical field. Thus, in the embodiment of FIGURE 12, the electrons 13 in the fluid and the electrons in the base N(B) repell one another, causing the base and the fluid immediately adjacent one another to be depleted of their electrons, thereby reducing the electron flow, and consequently the heat flow, from the base N(B) through the fluid to the emitter P(E). The more free electrons 13 there are in the fluid, the more the heat flow in this desired direction is reduced. This undesired "depletion effect" can be reduced by increasing the potential of the forward biasing battery 15 and/or, if the particular use permits, by establishing a positive electrode in the fluid for attracting the free electrons in the fluid and so causing less electron depletion in the base N(B) in the neighborhood of its surface exposed to the fluid.

The embodiment is applicable wherever it is desired to encourage thermal flow from a body 2 to a second body P(E). Thus, body 2 could be a heat exchange surface or the body of a space ship or an aeroplane, as further explained below.

Figure 15:
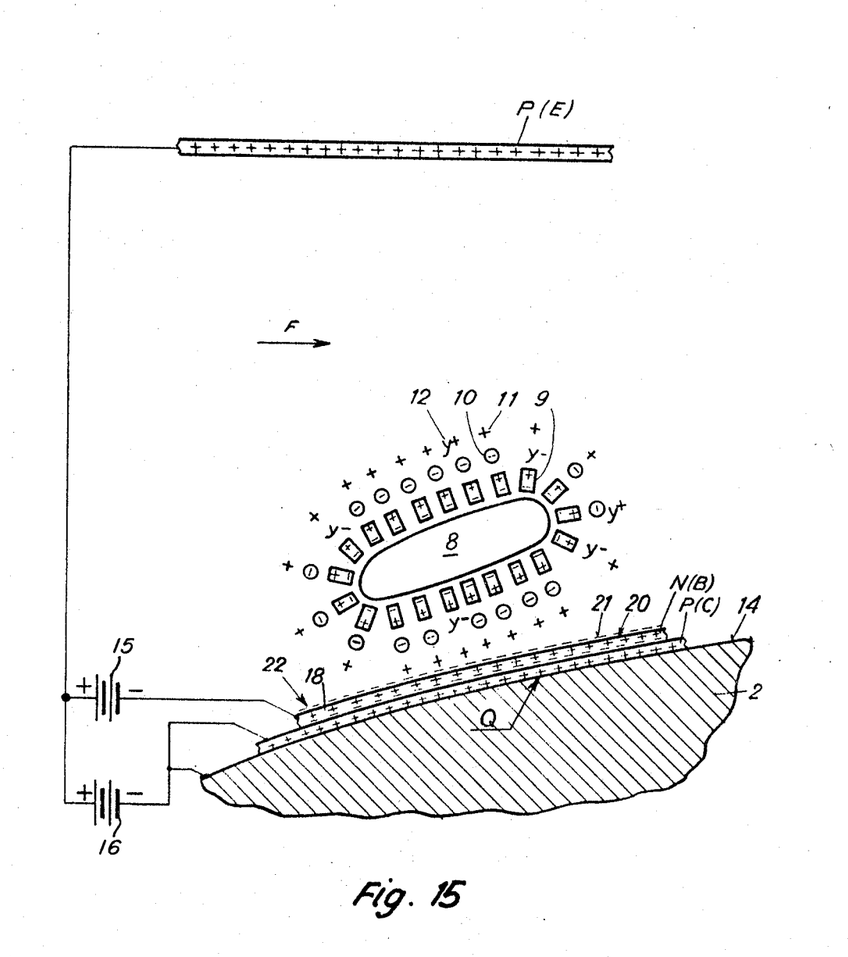
FIGURE 15 is similar to FIGURE 12, except that the fluid is boiling.

In both this embodiment and the similar one of FIGURE 15, particularly when these embodiments are used with air craft, the emitter P(E) can be a rigid grid fastened to the body 2 by means of dielectric supports and covered with a P-type semiconductor material. To increase the electron flow between the base and the emitter (in addition to those methods discussed above), and therefore the heat flow, the air, if that is the fluid, can be ionized, or an electrolyte employed for the fluid, or electrically charged carbon dust can be added to the fluid. Thus, if the body 2 is a heat exchanger, the fluid F could be an electrolyte. Alternatively, 2 could be a space ship surrounded by ionized air, encountered when reentering the earth's atmosphere, or an aeroplane, the air surrounding which is always to some extent ionized. Still further, the body 2 can be the container of a "canned" motor in a reactor, surrounded by a fluid rich in radio-active material.

In this embodiment the presence of positive ions, in the fluid, attracted to the base N(B) would give rise to a residual and undesired heat flow from the fluid to the body 2.

Figure 13:
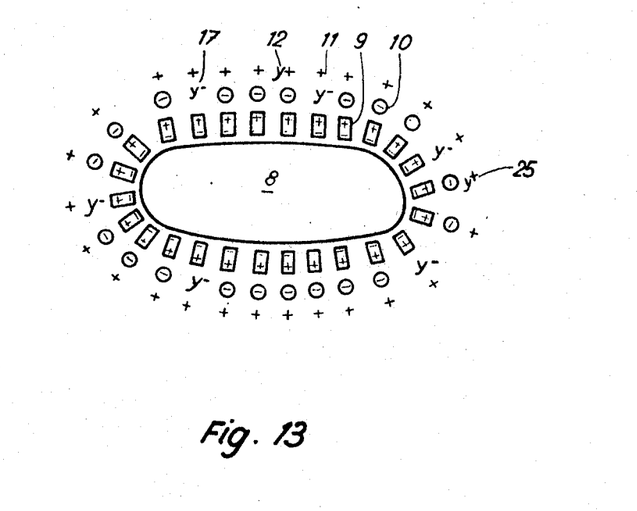
Figure 14:
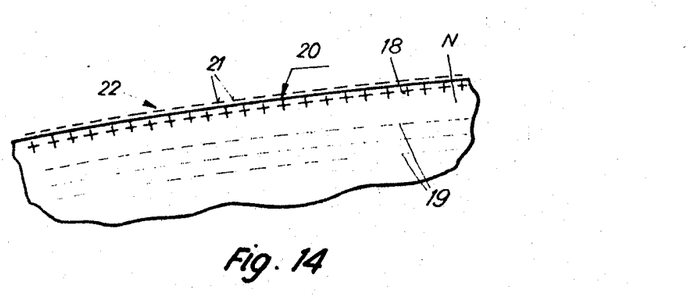
FIGURE 14 shows a semiconductor body having a Tamm surface state.

Under some conditions, such as boiling or condensation of the fluid relative to the heat transfer surface 14 shown in FIGURE 12, a reaction between the Helmholtz double layer of electric charges surrounding a bubble or droplet with the electrical double layer of charges adjacent to a semiconductor surface may be utilized to break up large bubbles or droplets on a heat exchange surface 14, as shown in FIGURES 13, 14 and 15. In FIGURE 13 is shown the arrangement of polar molecules 9, negative OH ions 10, negative impurity ions 17, and protons with positive impurity ions 25, all arranged around the surface of a water vapor bubble 8 in accordance with the reference work already noted, Static Electrification by Loeb. Reference numerals 10 and 11 again designate the Helmholtz double layer. It is a well known fact that when a vapor bubble forms on a heat transfer surface, or a condensation droplet forms, there is an appreciable unbalance in the double-layer of electric charges surrounding it. By further distorting the balance between the electric charges on *one side* of a bubble or condensation droplet, the physical shape of the bubble or droplet may be sufficiently distorted to cause its breakup into smaller bubbles or droplets, thereby causing an increase in the local fluid contact with the heat transfer surface, thus increasing the effective overall thermal transfer coefficient. One method of distorting the balance between the electric charges in the double-layer surrounding a bubble, or in a droplet, consists of exposing them to another local electric double layer comprised of the positive and negative charges 18 and 21, such as that associated with the surface 20 on a semiconductor; 18 is a positive space charge shown digarammatically in FIGURE 14 and described in The Electrochemistry of Semiconductors by P. J. Holmes, pages 74–96, Academic Press, 1962. This Helmholtz electrical double layer, comprising an outer electron layer 21 and an inner positive space charge layer 18, on the outside surface of a semiconductor, is common to various types of these materials, such as doped silica and germanium.

The electrons 19 are part of the valence band and the surface 20 is that of a N-type material. If P-type material is used, the layer 21 is positive. Thus, the electrical polarity of the outer charge sheet adjacent to the semiconductor surface, as shown in FIGURE 14, may be changed by using either a N-type or P-type material. In practice, this will be determined by the outer charges in the Helmholtz double layer associated with the bubble or condensation droplet. By the proper selection of the polarity of the outer charge sheet, a reaction with, or neutralization of, the outer charges on one side of a vapor bubble formed on the outer face of a semiconductor coating on a heat transfer surface, as shown in FIGURE 15, may be obtained. It will be observed that the embodiments of FIGURES 12 and 15 are the same, the latter figure merely being elaborated in order to explain heat transfer with boiling or condensation on the outer semiconductor, whereas the former figure relates to heat transfer without such boiling or condensation. For simplicity, the vapor bubble 8 in FIGURE 15 is shown some distance from the outer surface 20 of the semiconductor coating, but this interaction actually occurs during the formation of the vapor bubble 8 on the outer semiconductor surface 20. The magnitude and gradient of the outer charge sheet 21 may be varied and controlled by the use of an external electrode or emitter P(E) also made of semiconductor material and connected in a P-N-P type transistor circuit, which is similar to the one described above for FIGURE 12.

In the embodiment of FIGURE 15, it will be further understood that *were* the outer charges of the Helmholtz double layer negative (which is believed never to be true), the outer charge sheet 21 would have to be positive, necessitating a reversal of the present order of semiconductor materials: that is, the collector, base, and emitter would be respectively, N, P, and N semiconductors.

Figure 16:
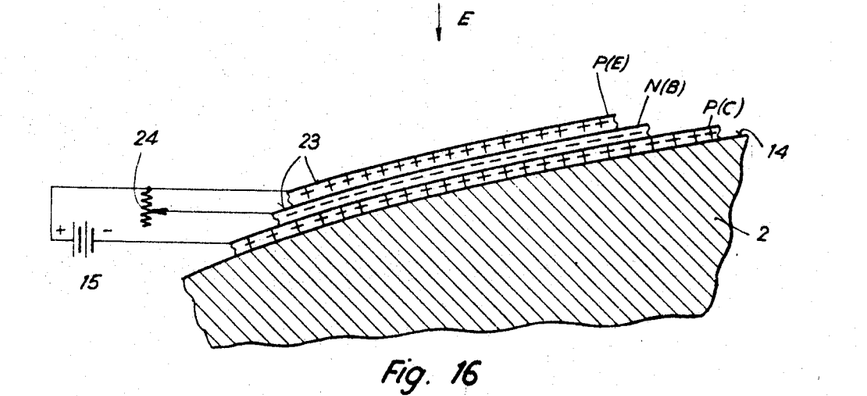
FIGURE 16 shows a body thermally insulated by a barrier layer photocell.

A barrier type semiconductor photocell 23 may be combined with a "forward" biased P-N-P type transistor assembly as shown diagrammatically in FIGURE 16, whereby as the photocell is illuminated by external photons E, electrons are generated in the base N(B). The migration of these electrons, thus generated, from the base to the emitter P(E) produces self-forward biasing between the base and the emitter, thereby effectively preventing a reverse electron flow from the emitter to the collector, and consequently the undesired movement of heat from the fluid to the body 2, should the former be at a higher temperature than the latter.

In the figure, the variable resistor 24, connected between the emitter and the base, completes the circuit for the electron flow therebetween and offers the advantage that the self-biasing potential can be increased or decreased by moving the tap to increase or decrease, respectively, the amount of resistance in the circuit.

The battery 15 forward biases the collector P(C) and the emitter P(E), so that even when photons are not incident on the emitter, there is a flow of current from the collector to the emitter and the establishment of a "bucking" potential to prevent the reverse flow of a current of thermal electrons.

In its practical application, the embodiment is useful in controlling the temperatures of buildings in hot climates.

One or more sides 2 of the building, in whole or in part, are covered with a P-N-P junction. The photons of the sunlight establish a self-forward bias which, together with the forward bias of battery 15, thermally insulate the walls of the building from the heat of the surrounding air. The potential of battery 15 is a matter of a few volts.

The P-N-P junction of FIGURE 16 can also be used to cover at least a part of the surface of an air craft or air vehicle, such as an aeroplane, missile, space ship, etc., for the purpose of controlling the conduction of heat from the fluid to the craft.

If the thermal flux level at the heat transfer surface 14 becomes appreciably greater than that in the adjacent fluid flow, thermal flux flow may occur by electron conduction from the heat transfer surface 14 to the fluid flow. This characteristic essentially constitutes a one-way thermal valve which will give minimum thermal conduction to the heat transfer surface, of photons and heat flux generated in or carried by the fluid flow adjacent to this solid body.

Depending upon the practical application of the preceding embodiments of the invention, some of the various fluid flows that can be employed therewith are those of hydrocarbons, air, all of the non-inert gases pure or in mixture, inert gases if they can be ionized, and cryogenic fluids.

In those embodiments where it is desirable, advantageous, or necessary (noting particularly, but not exclusively, the embodiments of FIGURES 1, 2, 2a, 2b, and 5) to have an appreciable ionization level in the fluid, at least in the vicinity of the body in the fluid, the level can be raised, if necessary, by coating the body with any suitable radio-active material, such as pitch blend, naturally occuring radium, or any other radio-active material, such as radio-active isotopes, of which the emission ionizes the fluid flow adjacent the body. If the radio-active material is also capable of exciting the rotational and vibrational modes in the molecular structure of the fluid locally surrounding the body—as would be the case with material emitting $\alpha$ or $\beta$ radiation—the local viscosity of the fluid is reduced and the skin friction on the body is lowered. Concomitant with these two phenomena is that of a reduced heat flow between the body and the fluid.

A still further embodiment of the invention is based upon the fact that the thermal conductivity and the viscosity of a fluid are affected by excitation of the rotational and vibrational modes in the fluid molecules. Thus, radio-active material can be used to raise the ionization level in the fluid flow about an aerodynamic or hydrodynamic body, for the purpose of exciting the rotational and vibrational modes in the fluid molecules, at least in the vicinity adjacent the body, thereby additionally varying the rate of heat transfer between the fluid and the body and, as will be explained further, the skin friction of the body in the fluid flow. The $\alpha$ and $\beta$ radiations from radio-active materials will excite the desired rotational and vibrational modes, to reduce the drag or skin friction. Thus, radio-active material, such as a radio-active isotope, can be applied to the outer surfaces of the semi-conductor junctions of the embodiments of FIGURES 7, 8, 10, 12, and 15, for example.

The radio-active material can be added to the outer surface of the outer semiconductor layer by known means, such as by being "painted" or deposited thereon, or interspersed or diffused into, or otherwise made a part of, the semiconductor at and/or locally below its surface.

There is a direct relationship between the viscosity of a fluid and its thermal conductivity: the more viscous it is the better it conducts heat, as shown for gases, for example, by C. O'Neal, Jr., and R. S. Brokaw in an article entitled "Relation Between Thermal Conductivity and Viscosity for Some Nonpolar Gases" in the Physics of Fluids, volume 5, No. 5, May 1962, pp. 567ff.

It is apparent that varying the viscosity of a fluid varies also the skin friction or drag on a body in the fluid and between which and the fluid there is relative movement. The more viscous a fluid is: the better its thermal conductivity: the greater the drag on the body. Thus, what might be called the *three characteristics* of a fluid—viscosity, heat conduction, and skin friction for a given surface—are mutually interdependent.

Skin friction drag is the predominant component of the total drag of aerospace vehicles during reentry to the earth's atmosphere and of hypersonic aircraft at extreme altitudes. In all types of airflow adjacent to an aerodynamic surface, there will always be a relationship between the heat transfer or conductivity and the local viscosity for the particular flow condition.

The terms *heat exchange surface, heat exchange interface, heat transfer surface,* and such like, as employed in this specification, are intended to embrace all surfaces in a fluid between which and the fluid there is a thermal flow or can be a thermal flow and all fluid-solid interfaces manifesting or potentially manifesting a thermal flow.

Further, the term *thermal sources,* as employed in the specification, is intended to embrace a body and its surrounding fluid as separate thermal sources, or a heat exchange or a heat transfer surface and the surrounding fluid as separate thermal sources, or two non-fluid bodies as separate thermal sources. That is, as thus employed the term *thermal source* does not imply that the source is a *net* source of heat, with respect to another source, but rather, unless its temperature is absolute zero, provide some heat carriers to even a much hotter source.

In all of the foregoing embodiments it will be understood that the body in the fluid flow have, as a general rule, a metallic surface.

Figure 17:
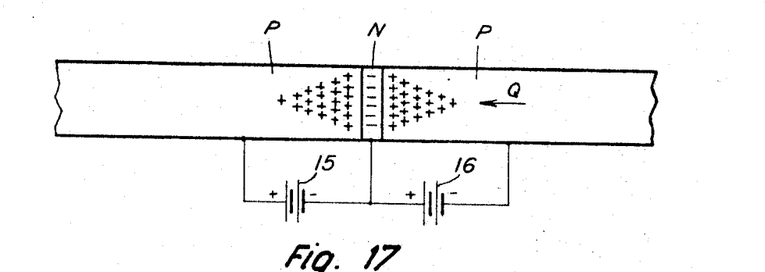
FIGURES 17 and 18 show a transistor junction for controlling the thermal conductivity between two bodies.
Figure 18:
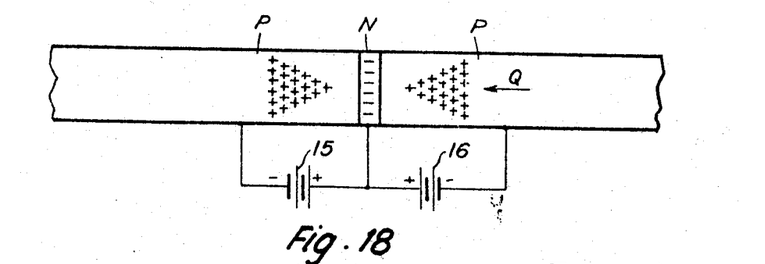

A P-N-P or N-P-N type transistor junction may be incorporated between two solid bodies of certain materials, to control the thermal conductivity between these two bodies as shown in FIGURES 17 and 18 which relate to a P-N-P type junction. By "forward" biasing the transistor junction as shown in FIGURE 17, a thermal flux flow may be established from right to left, provided there is a sufficient negative thermal gradient from right to left. Conversely, the thermal flux flow may be appreciably decreased by "reverse" biasing the transistor junction as shown in FIGURE 18.

The invention may be embodied in other specific forms without parting from the spirit or essential characteristics thereof. The present invention is therfore to be considered in all respects illustrative and not restrictive, the scope of the invention being indicated by the appended claims rather than the foregoing description, and all changes which come within the meaning and range of the equivalency of the claims are therefore to be embraced therein.

What is claimed is:

1. Method of controlling thermal flux flow between a heat transfer surface and a surrounding fluid flow, said surface having vapor bubbles or condensation droplets forming thereon: applying a first layer of semiconductor material of one kind of conductivity to said surface; applying to said first layer at least a second layer of semiconductor material of the opposite kind of conductivity; establishing on the outer surface of said second layer having a local electric double-layer that sufficiently distorts the balance between Helmoltz double-layer charges on one side of the bubbles or droplets to cause them to breakup; and biasing said two layers.

2. Method of claim 1, including the steps of controlling the magnitude and gradient of the outer charge sheet of said local electric double-layer by means of a semiconductor electrode in said fluid and of the same kind of conductivity as said first layer and physically spaced from said second layer, and of electrically connecting said electrode to said first and second layers through biasing means.

3. Method of claim 1, wherein the type of conductivity of said second layer is chosen in dependence on the polarity of the outer charges in the Helmholtz double-layer associated with the bubbles or droplets.

4. The method of claim 2, including the step of establishing a positive electrode in said fluid, for the purpose of reducing "depletion effect."

5. Method of controlling thermal flux flow between a heat transfer surface and a surrounding fluid flow: supplying at least a part of said surface with a P-N-P junction, of which the two outer semiconductor layers are a barrier type photocell; irradiating the photocell with photons; and forward biasing the P-N-P junction.

6. A combination for controlling thermal flux flow comprising a heat source and a heat sink being in proximity to each other, a P material and an N material joined to form a junction, said P-N junction connected between said source and said sink, said P material and said N material being oriented between said source and said sink such that thermal flux flows from the source to the sink through one of said materials than through the junction then through the other of said materials, and electrical biasing means for controlling the biasing of said P-N junction whereby forward biasing raises the thermal flux conductivity and reverse biasing lowers the thermal flux conductivity.

7. The combination of claim 6 wherein the heat source and sink comprise two bodies: one surface of one of the said material contacting one body and one surface of the opposite material contacting the other body.

8. The combination of claim 6 wherein one of the P or N materials is in electrical communication with the heat source.

9. The combination of claim 8 wherein said heat source includes a fluid-solid interface.

10. The combination of claim 9 wherein the heat sink comprises a body, one of said N and P layers being coated on the body.

11. The combination of claim 10 wherein said biasing means includes electrons contained in the fluid.

12. The combination of claim 10 wherein said biasing means includes a source of electric potential.

13. The combination of claim 9 further including means for moving the surface relative to the fluid so that the heat includes surface friction heat.

14. The combination of claim 13 wherein the body is that of an aircraft and aerodynamic drag is reduced as the junction is back biased.

15. The combination of claim 10 wherein the layer of material nearer said body comprises a first layer and the other layer comprises a second layer, a third layer of the same material as said first layer being electrically connected to said second layer and being physically spaced therefrom, said biasing means further biasing said third layer relative to said second layer.

16. The combination of claim 15, including radioactive material on the surface of the second layer capable of exciting the rotational and vibrational modes in the fluid molecules at least near the material.

17. The combination of claim 15 wherein said third layer is biased positive and the fluid-solid interface includes the surface of said second layer facing the third layer.

18. The combination of claim 17 wherein said body is part of an aircraft including dielectric supports for securely spacing the third layer from the second.

19. The combination of claim 17 wherein the fluid is an electrolyte.

20. The combination of claim 17 wherein the fluid contains radioactive material.

21. The combination of claim 10 wherein the layer of material nearer said body comprises a first layer and the other layer comprises a second layer, a third layer of the same material as said first layer being electrically connected to said second layer and being coated on said second layer and said biasing means further biasing said first layer relative to the third layer to establish a small current between said first and third layers, said second and third layers comprising a barrier-type photocell such that the second layer emits electrons responsive to the third layer receiving photons, a load connected between said second and third layers to develop self-forward biasing between the second and third layers.

22. The combination of claim 21 wherein said load is variable.

23. The combination of claim 11 wherein the body is metallic and the layer coating the body comprises an oxide.

24. The combination of claim 10 further including radioactive material on the outer surface of the exposed P or N material for exciting the rotational and vibrational modes of the fluid molecules at least near the outer surface layer.

25. A method of controlling the transfer of thermal flux to and from a body having coated thereon first and second layers of opposite type semiconductor materials forming a P-N junction therebetween so that the energy must pass through the second layers, the junction, and then the first layer to reach the body, the method comprising exposing the outer surface of the second layer to a fluid and moving the body relative to the fluid to generate surface friction heat at the exposed surface of said second layer and electrically biasing the junction to permit thermal flux transfer through the junction when forward biasing and to prevent thermal flux transfer through the junction when back biasing.

26. Method of claim 25 establishing a semiconductor electrode in said fluid and physically spaced from said second layer and of the same kind of conductivity as said first layer; electrically connecting said electrode to the first and second layers through biasing means, for establishing a thermal path from said body through said first and second layers and said fluid to the electrode.

27. The method of claim 26, including the step of establishing a positive electrode in said fluid, for the purpose of reducing the "depletion effect."

28. The method of claim 25, wherein said body is that of an air craft.

29. The method of claim 28, including the step of applying a radio-active material to said body.

30. The method of claim 25, wherein said body is metallic, and including the step of employing the oxide coating on said body as said first layer.

31. The method of claim 25 wherein the step of electrically biasing includes artifically charging the fluid with electrons.

32. The method set forth in claim 25 wherein the step of electrically back biasing includes coating at least a part of the exposed surface of the second layer with radioactive material to artificially charge the fluid with electrons.

33. A method of controlling the transfer of thermal flux to and from a body having coated thereon first and second layers of opposite type semiconductor materials forming a P-N junction therebetween so that the energy must pass through the second layer, the junction, and then the first layer to reach the body, the method comprising exposing the outer surface of the second layer to a fluid which is at a different temperature from said body and electrically biasing the P-N junction to permit thermal flux flow between the body and fluid when forward biasing and to prevent thermal flux flow between the body and fluid when back biasing.

34. The method of claim 33, wherein said body is at least one wall of a building whereby to reduce and enhance heat flow from said fluid to said one or more walls.

35. A method of controlling thermal flux flow between two solid bodies separated by three layers of semiconductor material of alternate conductivity types forming two P-N junctions arranged across the thermal flux flow path, said method comprising electrically biasing the two outermost layers relative to the center layer such that when both junctions are forward biased a low thermal resistance path is established and when at least one junction is back biased a high thermal resistance path is established.

36. A method for controlling the thermal flux flow between two solid bodies separated by two layers of opposite types of semiconductor materials forming a P-N junction arranged across the path of thermal flux flow comprising electrically biasing said junction to establish one of a high and low thermal flux flow resistance path by one of back and forward biasing the junction, respectively.

37. A method of controlling energy thermal flux flow between a heat transfer surface and a surrounding fluid separated by three layers of alternate types of semiconductor material forming two P-N junctions arranged across the thermal flux flow path comprising electrically biasing the junctions to establish one of a high and low energy resistance path by biasing the junctions in one of a back and forward direction, respectively.

38. The method of claim 37, wherein the surface includes at least one wall of a building, whereby to reduce and enhance the heat flow to and from said one or more walls.

References Cited

UNITED STATES PATENTS

| | | | |
|---|---|---|---|
| 2,605,377 | 2/1952 | Kaehni et al. | 165—1 X |
| 2,836,776 | 5/1958 | Ishikawa et al. | 317—242 |
| 2,946,541 | 7/1960 | Boyd | 244—130 X |
| 2,990,775 | 7/1961 | Henson | 102—49 |
| 3,095,163 | 6/1963 | Hill | 244—12 |
| 3,162,398 | 12/1964 | Clauser et al. | 102—92.5 |
| 3,224,485 | 12/1965 | Blomgren | 165—1 X |
| 3,242,982 | 3/1966 | Sherman | 165—134 |
| 3,302,703 | 2/1967 | Kelly | 165—1 X |

FOREIGN PATENTS

| | | |
|---|---|---|
| 373,051 | 4/1923 | Germany. |
| 635,784 | 4/1950 | Great Britain. |

ROBERT A. O'LEARY, *Primary Examiner.*

ALBERT W. DAVIS, JR., *Assistant Examiner.*

U.S. Cl. X.R.

102—105; 165—32, 96; 244—1, 117.1, 130; 317—230